United States Patent [19]

Iida et al.

[11] Patent Number: 4,565,456

[45] Date of Patent: Jan. 21, 1986

[54] ELECTRONIC THERMOMETER

[75] Inventors: Takayuki Iida, Tokyo; Tamio Miyake, Kyoto, both of Japan

[73] Assignee: Omron Tateisi Electronics Co., Kyoto, Japan

[21] Appl. No.: 600,288

[22] Filed: Apr. 13, 1984

[30]   Foreign Application Priority Data

Apr. 13, 1983 [JP]   Japan ................................. 58-65927
Mar. 7, 1984 [JP]   Japan ................................. 59-44522
Apr. 12, 1984 [JP]   Japan ................................. 59-56948

[51] Int. Cl.$^4$ ............................................. G01K 7/00
[52] U.S. Cl. .................................... 374/169; 374/170
[58] Field of Search ............... 374/102, 103, 169, 170, 374/172; 128/736; 340/756, 760, 753, 754; 307/310; 40/458; 364/557, 567, 737, 573, 571

[56]   References Cited

U.S. PATENT DOCUMENTS 3,702,076  11/1972  Georgi ................................. 374/170
4,092,863  6/1978   Turner ................................. 374/169

Primary Examiner—Charles Frankfort
Assistant Examiner—Thomas B. Will
Attorney, Agent, or Firm—Stevens, Davis, Miller & Mosher

[57]   ABSTRACT

The electronic thermometer comprises a temperature sensor which senses the temperature of an object, a prediction temperature computing apparatus for deriving a converged temperature according to the temperature sensed by the temperature sensor, apparatus for providing a range of error associated with the predicted converged temperature computed by the prediction temperature computing apparatus, and a display for displaying the range of error.

9 Claims, 16 Drawing Figures

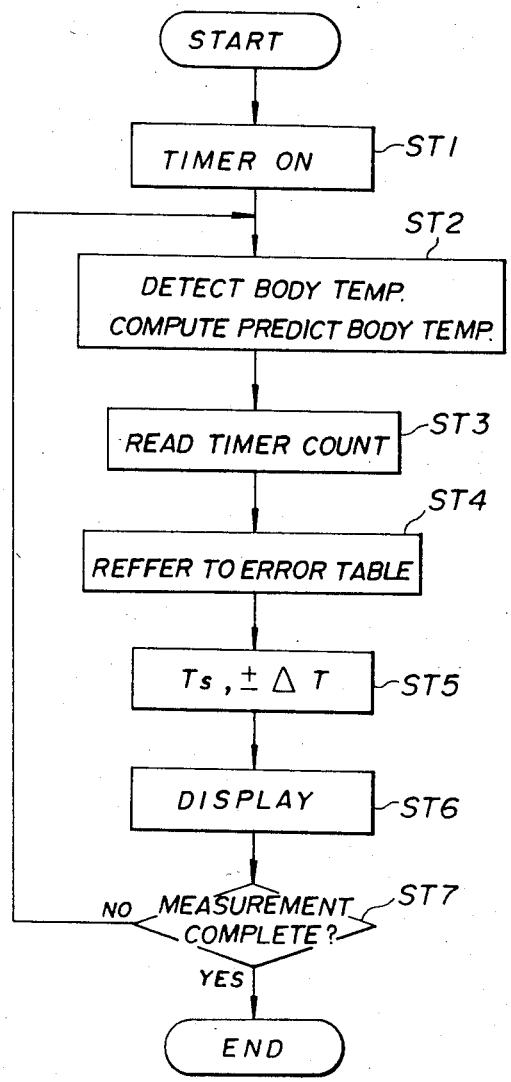

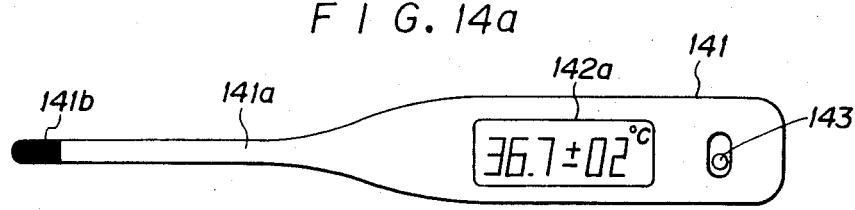
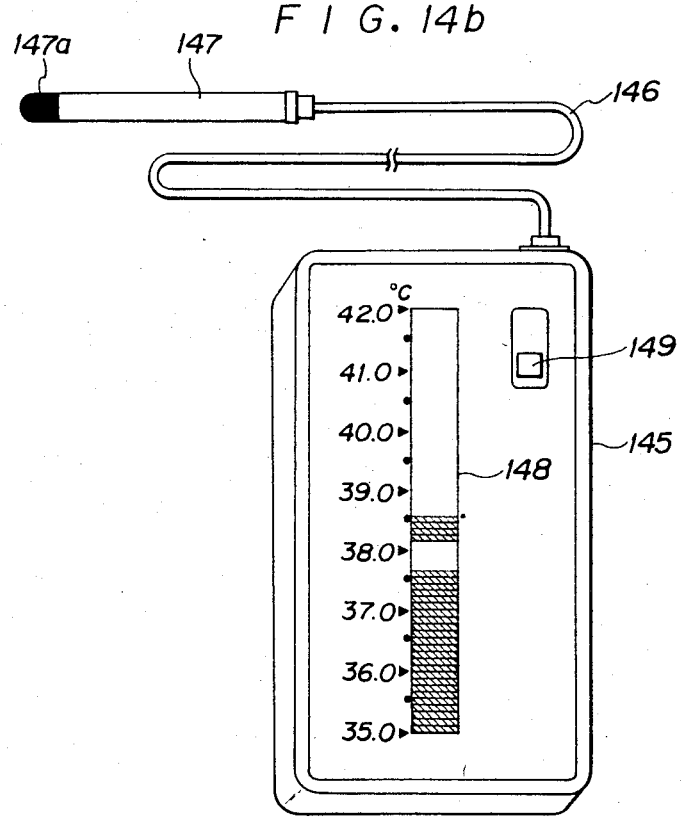

ELECTRONIC THERMOMETER

BACKGROUND OF THE INVENTION

The present invention relates to an electronic thermometer such as an electronic clinical thermometer, and in particular to an electronic thermometer which can measure the temperature of an object at an early time after the beginning of measuring.

Generally in an electronic thermometer, for instance in an electronic clinical thermometer, the sensing portion is placed under the armpit or under the tongue of a patient for temperature measurement, but it normally takes time before this sensing portion comes into a thermal equilibrium with the patient's body temperature. According to a conventional electronic thermometer, either (a) the temperature as it transits from a changing state to a stable state is continually displayed, or (b) after the lapse of a certain time period after the beginning of the measurement process a converged body temperature is predicted and is then displayed once and for all. However, simply displaying the changing value of the body temperature as in case (a) does not give a stable converged or final temperature value at an early time, while on the other hand just performing body temperature prediction once as in case (b) may give a seemingly definite body temperature at an early time but cannot provide a high quality body temperature measurement at this time point. Thus, the sooner a body temperature prediction is made the more the predicted temperature value contains error, and conversely the later a body temperature prediction is made the more the predicted temperature value approaches the actual body temperature value but the longer it takes to make the prediction, so the more the benefit of making the prediction at all becomes irrelevant. Furthermore, the user cannot readily know how much error a temperature value prediction actually contains.

SUMMARY OF THE INVENTION

Accordingly, it is the primary object of the present invention to provide an electronic thermometer which can show a converged temperature at an early time and can measure more accurately the converged temperature with the passage of time.

According to the most general aspect of the present invention, these and other objects are accomplished by an electronic thermometer, comprising a temperature sensor which senses the temperature of an object, a prediction temperature computing means for deriving a converged temperature according to the temperature sensed by the temperature sensor, a means for providing a range of error associated with the predicted converged temperature computed by the prediction temperature computing means, and a display means for displaying the range of error.

According to the electronic thermometer of this invention, since the converged temperature is predicted at a plurality of predicted time points after different passages of time after the beginning of measurement and the ranges of error at these time points as well as these predicted temperatures are displayed, not only measurement can be made at an early time but also a converged temperature which has a greater accuracy corresponding to the longer passage of time can be produced.

BRIEF DESCRIPTION OF THE DRAWINGS

The present invention will now be shown and described with reference to the preferred embodiments thereof, and with reference to the illustrative drawings, which are not intended to be limitative of the scope of the present invention in any way, since the scope of the present invention is to be defined solely by the appended claims. In the drawings:

FIG. 4 is a memory map showing an error table in a RAM of the first embodiment;

FIG. 5 is a flow chart showing the action of the first embodiment;

FIGS. 14(a) and 14(b) are perspective views of the external appearances of electronic thermometers according to the present invention, relating respectively to a digital type and an analog type embodiment.

DESCRIPTION OF THE PREFERRED EMBODIMENTS

Figure 1:
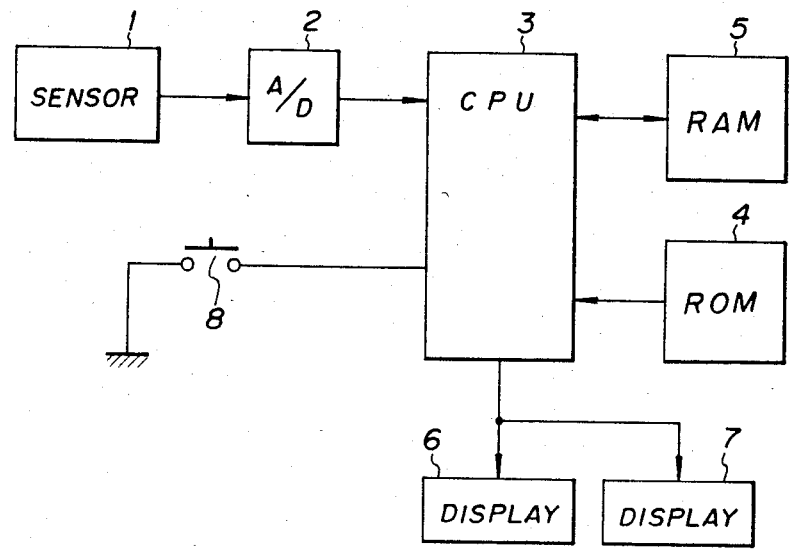
FIG. 1 is a block diagram showing the first embodiment of the electronic thermometer of this invention.

The present invention will now be described with reference to the preferred embodiments thereof, and with reference to the appended drawings. FIG. 1 shows a block diagram of the electronic thermometer according to the third embodiment of this invention. In this drawing, 1 denotes a sensor such as a thermistor for sensing body temperature, 2 is an A/D converter for converting an output analog signal of the sensor 1 into a digital signal, and 3 is a CPU which predicts a converged temperature at predetermined time points by receiving the sensed temperature signal from the A/D converter 2, according to a program stored in a ROM 4, and which performs a calculation for determining the range of error. 5 is a RAM for storing various data during the calculation process. 6 is a body temperature display for displaying a predicted converged body temperature, and 7 is an error display for displaying the range of error of the converged temperature displayed on the body temperature display 6. Digital displays are used for the body temperature display 6 and error display 7, and per se known display elements such as liquid crystal, light emitting diode, or fluorescent tube types are used. 8 is a start switch for commanding the start of measurement.

The RAM 5 is provided with an error table 41 as shown in FIG. 4. In this error table 41 is stored data of the predicted range of error associated with the passage of time after the beginning of measurement.

In the drawing it is shown as an example that the range of error is ±0.5° C. after the passage of 20 seconds, ±0.4° C. after the passage of 40 seconds, and ±0.1° C. after the passage of 10 minutes. These error ranges relative to time periods may be set in advance according to experiment, but may alternatively be computed from actual measured temperatures.

Now, the action of this first embodiment of the electronic thermometer of this invention will be described, with reference to the flow chart of FIG. 5.

When the start switch 8 is turned on, action begins, and a timer is activated at step ST1. This timer is for counting the passage of time from the beginning of measurement, and is incorporated in the CPU 3 although not specifically shown in the drawing. Then the sensed output of the sensor 1 is inputted at step ST2 and a predicted body temperature Ts is computed in this step. An example of the method of computing this predicted body temperature Ts will be given later. Then the time count value in the timer is read out and the time of computing the predicted body temperature is obtained, in ST3. Then in ST4 an error table 41 is referred to. Then in ST5 the error Δt at that time is read out from the RAM 5 and the predicted body temperature data Ts and the error data ±ΔT is obtained. And in step ST6 both these data are displayed in the respective displays. In other words, the predicted body temperature Ts is displayed on the body temperature display 6 and the error data ΔT is displayed on the error display 7. Then in step ST7 it is determined whether the measurement is complete or not, and, if the start switch 8 is not turned off, in the case of a NO answer the process returns to step ST2 and the processing in steps ST2 to ST6 is repeated as time passes and the computations of the predicted temperature and the derivation of the error associated with the passage of time are continually performed and the predicted body temperature and its range of error are displayed each time as a pair.

Figure 2:
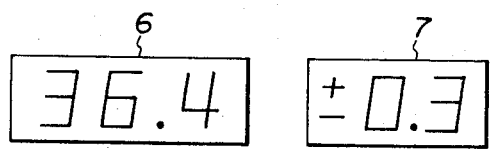
FIGS. 2 and 3 are plan views of the displays of the first embodiment, showing exemplary results of the operation thereof.

For instance, if the predicted body temperature after the passage of 1 minute is 36.4° C., then the range of error after the passage of 1 minute may be found to be ±0.3° C. from the error table 41. As shown in FIG. 2, on the temperature display 6 is displayed 36.4° C., and ±0.3° C. is displayed on the error display 7. Therefore, after the passage of 1 minute, the user can see that the range of error is ±0.3° C. and the body temperature is 36.4° C., by looking at the displays. If he wants to have a more accurate reading, he may continue the measurement. For instance, if he continues the measurement for ten minutes in all, and an indication of 36.6° C. is obtained on the body temperature display 6, then ±0.1° C. will be displayed on the error display 7 and the user can know that the body temperature is 36.6° C. with an error range of ±0.1° C., and can perform more reliable body temperature measurement than after the passage of only one minute. Thus, this electronic thermometer can show the converged body temperature and its range of error, for each particular time point from an early time to an almost steady point after the passage of a substantially long time. Therefore since the user can take into account the range of error at each point he can make a body temperature measurement with an accuracy which suits his particular purpose.

Figure 3:
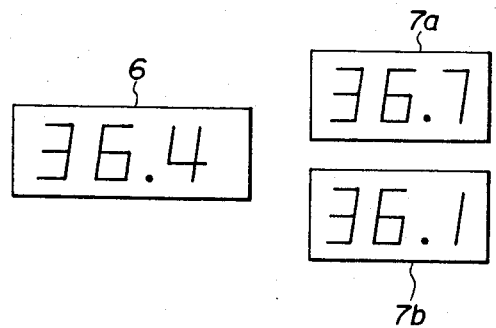

Although in the above embodiment the error display 7 displays both the positive and negative error ranges, or ±ΔT, this display may be replaced by a pair of error displays 7a and 7b as shown in FIG. 3 for showing a body temperature Ta+ΔT (36.7° C.) including an upper error limit on the one and a body temperature Ta−ΔT (36.1° C.) including a lower error limit on the other. By having such a display, the user can know at a glance what range the converged temperature will fall in just by looking at the display.

Figure 6:
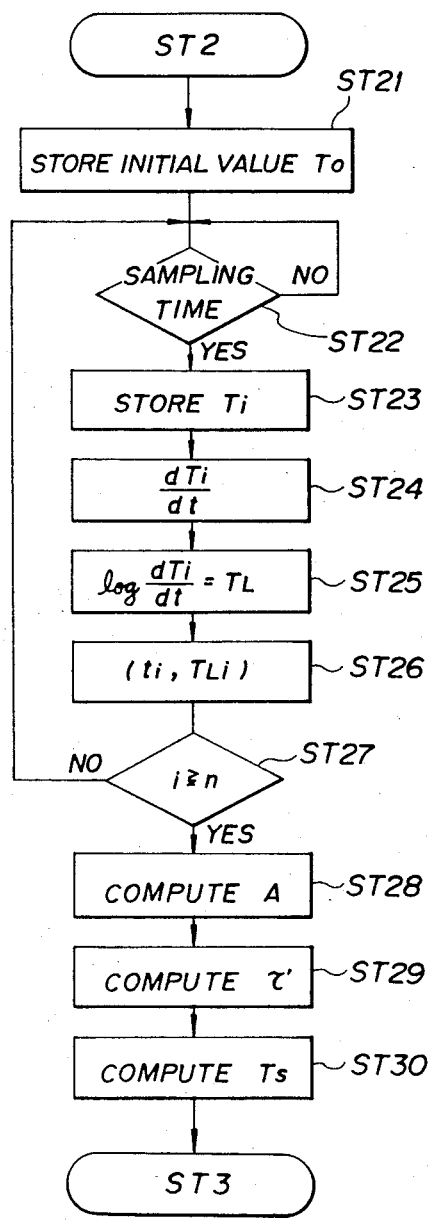
FIG. 6 is a flow chart showing a subroutine for computing a predicted body temperature, used in the first embodiment.

Now a concrete example of the method of computing the predicted body temperature Ts in step ST2 shown in FIG. 5 will be described in the following, with reference to the flow chart of FIG. 6. The method of computing the predicted body temperature shown here was invented by the inventor, and according to it, noting that there is a linear relation between the logarithm $T_L$ of the time derivative of the temperature T of an object and the time t, and that this relation can be expressed as:

$$T_L = A - \tau' t$$

the constants A and $\tau'$ are obtained by a recursion method and the converged body temperature Ts is predicted from these constants.

First, in step ST21 an initial temperature $T_0$ is stored. Then, in step ST22, it is determined whether the sampling time has come or not, and when it has come in step ST23 a sensed temperature Ti which is taken in through the A/D converter 2 is stored in the RAM 5. Then the time derivative $dT_i/dt$ of the sensed temperature Ti is computed in step ST24, and the logarithm of this value $T_{Li}$ is taken in step ST25. Then in step ST26 the computed $T_{Li}$ and the relevant sampling time $t_i$ are stored in the RAM 5. Then in step ST27 it is determined whether the number of sampling times i has reached an initially defined value n or not. If it has not, the flow of control returns to step ST22, and thereafter steps ST22 through ST26 are repeated upon arrival of each sampling time until the number of sampling times i reaches the value n. By this series of processing steps, the sampling times $t_1$ to $t_n$ and the logarithms $T_L1$ to $T_Ln$ of the time derivative of the sensed temperature at each sampling time are stored in the RAM 5. When the sampling times i has reached the value n, according to the data $t_1$ to $t_n$ and $T_L1$ to $T_Ln$ obtained in the above described routine, the constants A and $\tau'$ are computed from the following formulae, based on the recursion method, in steps ST28 and ST29:

$$A = \frac{\Sigma t_i^2 \, \Sigma T_{Li} - \Sigma t_i \, \Sigma t_i \, \Sigma T_{Li}}{n \Sigma t_i^2 - (\Sigma t_i)^2}$$

$$\tau' = \frac{n \Sigma t_i \, T_{Li}}{n \Sigma t_i^2 - (\Sigma t_i)^2}$$

From these formulae, the characteristic curve which is peculiar to the patient on which the measurement is being made is determined, and the converged temperature Ts is computed from the equation $Ts = (e^A/\tau') + T_0$, in step ST30.

Figure 7:
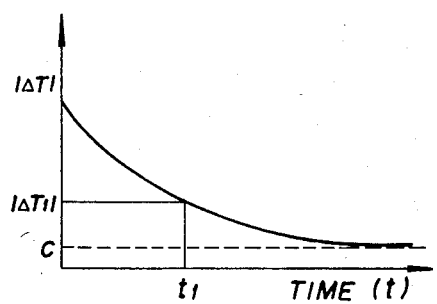
FIG. 7 is a graph showing an absolute value delta T between the actual converged temperature and the predicted temperature at an arbitrary time ti.

Since the actual error of the converged temperature from the experimental result at each sampling time $t_i$ becomes smaller than the value expressed as:

$$|\Delta T| = T_s \times \frac{S}{(t+b)^m} + c$$

where s, b, e, and m are constants (see FIG. 7), there is displayed either Ts±ΔT or else Ts−|ΔT|∼Ts+|ΔT| as the display of temperature at time t. The range of error at this time t may be averaged and stored in an error table 41 as shown in FIG. 4, but may also be computed from the above formula at each time so as to make an error table 41 anew every time.

Figure 8:
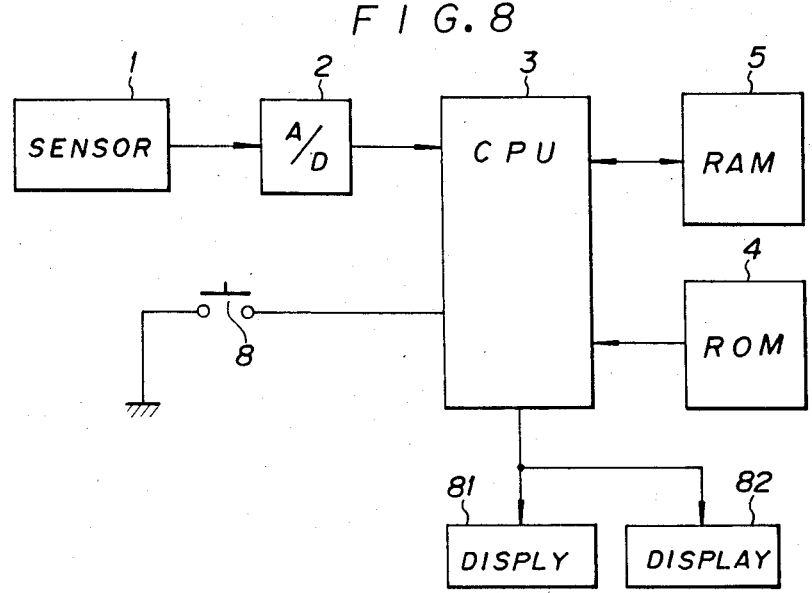
FIG. 8 is a block diagram showing the second embodiment of the electronic thermometer of this invention.
Figure 9:
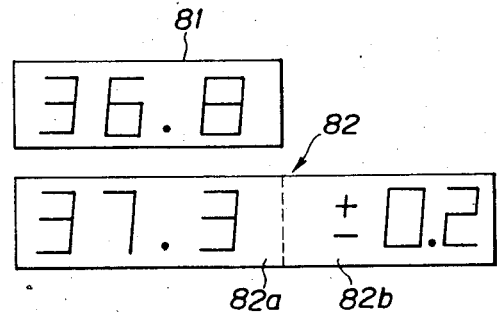
FIGS. 9 and 10 are plan views of the displays of the second embodiment, showing exemplary results of the operation thereof.

FIG. 8 is a block diagram showing the electronic thermometer of the second embodiment of this invention.

The electronic thermometer of the second embodiment is similar to that of the first embodiment but is provided with displays 81 and 82 in place of the displays 6 and 7.

The display 81 is a present sensed body temperature display, displaying the present sensed temperature.

The display 82 is a prediction body temperature display which displays the predicted body temperature including the range of error of the body temperature.

The display elements used in these displays 81 and 82 are digital display elements similar to those of the device of the first embodiment.

Figure 11:
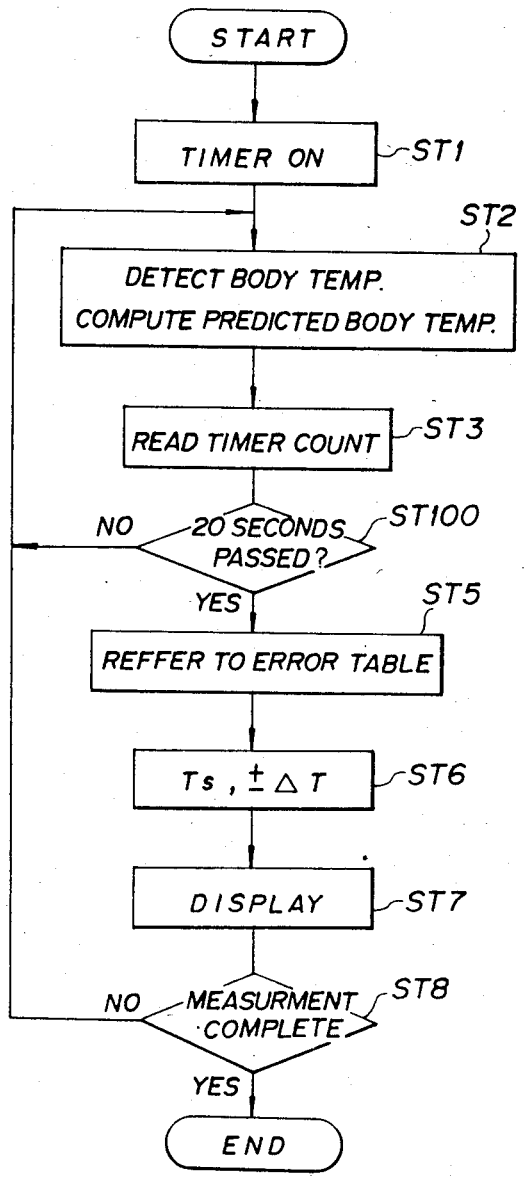
FIG. 11 is a flow chart showing the action of the second embodiment.

Now, the action of the electronic thermometer of the second embodiment will be described according to the flow chart shown in FIG. 11.

As in the first embodiment, action is started by turning on the start switch 8 and the timer is activated in step ST1. Then the sensed output of the sensor 1 is taken in and the predicted body temperature Ts is computed in step ST2, and the time count of the timer is read out in step ST3. The routines of these steps ST2 and ST3 are repeated until the passage of twenty seconds after the beginning of measurement, by the operation of step ST100. That is, the temperature is not displayed during this period, because the sensed temperature immediately after the beginning of measurement is not stable.

The computation of the predicted body temperature Ts performed in step ST2 is carried out according to the previously described procedure (see FIG. 6), and an error table 41 is provided in the RAM 5.

After the passage of twenty seconds after the beginning of the measurement, the flow of control proceeds to step ST7 through steps ST5 and ST6, and the predicted body temperature Ts including the range of error±ΔT and the present sensed temperature T are displayed on the respective displays 82 and 81. Then the above operations are repeated until the start switch 8 is turned off, by the operation of step ST8.

For instance, if the predicted body temperature after the passage of three minutes is 37.3° C., the range of error after the passage of three minutes is ±0.2° C. (see FIG. 4). If the present body temperature is 36.8° C. at this time point, as shown in FIG. 2, the present sensed body temperature 36.8° C. is displayed on the display 81, the predicted body temperature 37.3° C. is displayed on the predicted body temperature display portion 82a of the predicted body temperature display 82, and the range of error ±0.2° C. is displayed on the error range display portion 82b of the predicted body temperature display 82.

By looking at these displays, the user can know that the predicted body temperature is 37.3° C. and the error has diminished to ±0.2° C., and further that the present body temperature has reached 36.8° C., and may stop the measurement if a rough measurement is sufficient.

When he wants to have a measurement of a greater accuracy, he may continue the measurement until a permissible range of error is attained.

Figure 10:
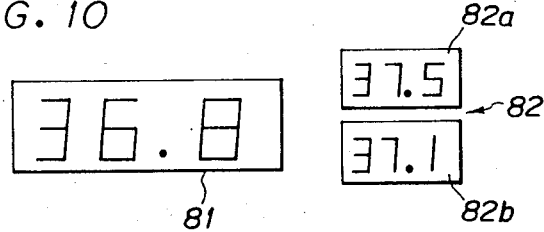

Although in the second embodiment described above the predicted body temperature display 82 displays a predicted body temperature and the range of error in both plus and minus or ±ΔT, these displays may be displayed on a separate display. And in place of these displays two displays 82a and 82b as shown in FIG. 10 may be provided to display a body temperature $t_s + \Delta T$ (37.5° C.) including an upper error limit on the one and a body temperature $T_s - \Delta T$ (37.1° C.) including a lower error limit on the other. By having such a display, the user can know at a glance what range the converged temperature will fall in just by looking at the display.

Figure 12:
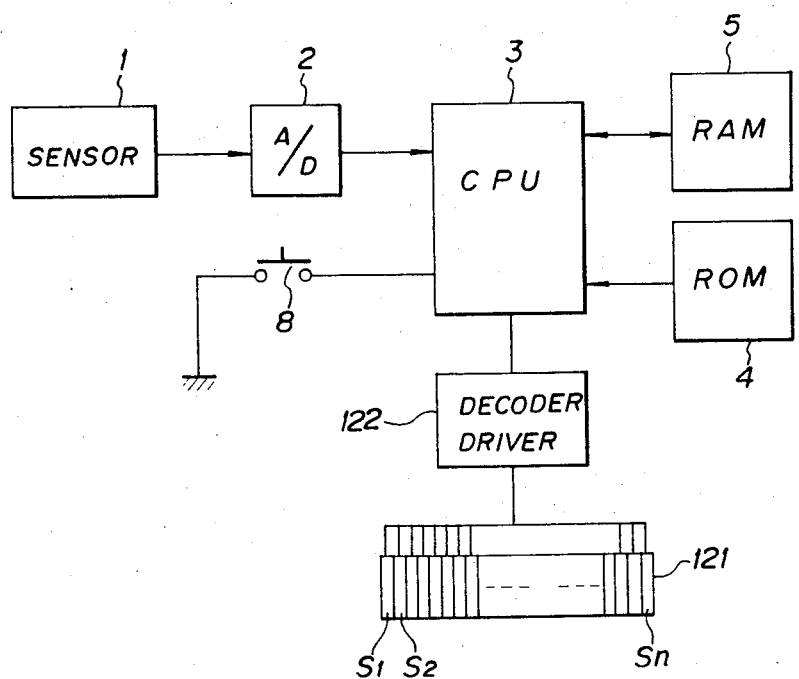
FIG. 12 is a block diagram showing the third embodiment of the electronic thermometer of this invention.

Further, FIG. 12 is a block diagram of the electronic thermometer of the third embodiment of this invention.

The electronic thermometer of this third embodiment performs an action similar to that of the first embodiment (see FIGS. 5 and 6), but is adapted particularly to display the present sensed body temperature and the predicted body temperature including the range of error in analog form.

Figure 13A:
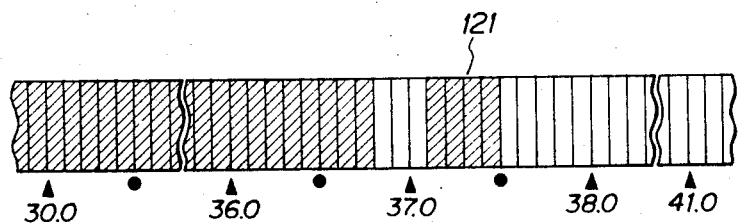
FIGS. 13(a) and 13(b) are plan views of the displays of the third embodiment, showing exemplary results of the operation thereof.
Figure 13B:
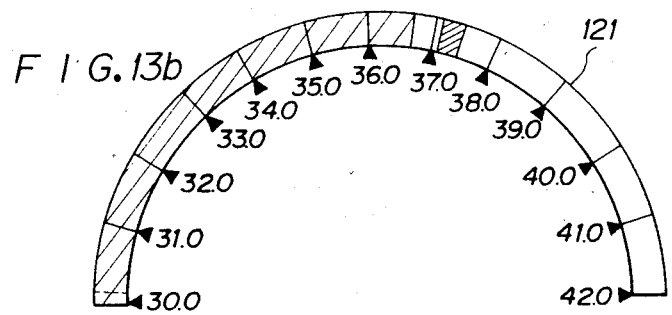

Namely, the display 121 is comprised of a plurality of rectangular segments $S_1$ to $S_n$ arranged either in a horizontal row (FIG. 13(a)) or in an arcuate row (FIG. 13(b)), and each segment consists for instance of a LCD and is driven by a decoder driver 122.

This display 121 may be provided either as two separate displays, the one for displaying the present sensed body temperature and the other for diplaying the predicted body temperature including the range of error, as shown in FIG. 12 or as a single display as shown in FIGS. 13(a) and 13(b).

For instance, if the predicted body temperature after the passage of 3 minutes is 37.3° C., since the range of error after the passage of three minutes is ±0.2° C. (see error table 41), the range of the predicted body temperature is found to be from 37.1° C. to 37.5° C. If the present body temperature is 36.8° C. at this time point, these present body temperature and range of the expected body temperature are displayed as shown in FIG. 13. Namely, the present body temperature is displayed by lighting up the display segments of the leftmost end of the display 121 up to 36.8° C. The predicted body temperature range is displayed by lighting up the display segments of from 37.1° to 37.5° C. The display mode of this predicted body temperature range of from 37.1° C. to 37.5° C. is a blinking mode, to distinguish it from the display mode of the present body temperature.

Lastly, FIGS. 14(a) and 14(b) show the external appearance of embodiments of the above described electronic thermometer.

The electronic thermometer shown in FIG. 14(a) is comprised of a main body casing 141, a small diameter sensor arm 141a integrally formed on an end thereof, and a temperature sensor 141b provided at the free end of this sensor arm 141a. And the main body casing 141 is provided with a digital display 142a or 142b as relating to the second embodiment described above (shown on the side of the drawing as an alternative). And a slide type power switch 143 is provided in the other end of the main body casing 141.

The electronic thermometer shown in FIG. 14(b) is comprised of a main body casing 145, a probe 147 connected to the main body casing 145 by way of a cable 146, and a temperature sensor 147a provided on the free end of the probe 147. An an analog display 148 similar to the one shown in the third embodiment described above and a slide type power switch 149 are provided in the main body casing 145.

In the above described embodiments, the ranges of errors were set so as to correspond to the passage of time from the beginning of measurement, but this invention is not to be limited by this concept, but may be associated with the predicted converged temperature irrespective of the passage of time. For instance, by comparing the temperature differences of adjacent predicted converged temperatures, the range of error may be computed according to the difference of the temperature differences. Alternatively, for instance, by correcting the range of error associated with each predicted converged body temperature derived from the temperature difference of two adjacent predicted converged body temperatures, the corrected range of error may be selected as the final range of error. By doing so, even when the sensor and the body become separated from each other during measurement, no measurement error occurs. Other modifications are also possible. Therefore, the present invention is not to be considered as limited by any features of the shown embodiments, or of the drawings, but solely by the appended claims.

We claim:

1. An electronic thermometer, comprising a temperature sensor which senses the temperature of an object, a prediction temperature computing means for deriving a converged temperature according to the temperature sensed by the temperature sensor, a means for providing a range of error associated with the predicted converged temperature computed by the prediction temperature computing means, and a display means for displaying the range of error.

2. An electronic thermometer according to claim 1, wherein the display further displays the predicted converged temperature.

3. An electronic thermometer according to claim 1, wherein the display means is adapted to display the predicted converged temperature, the predicted converged temperature with an upper limit error added thereto, and the predicted converged temperature with a lower limit error added thereto.

4. An electronic thermometer according to claim 1, wherein the display means is further adapted to display the temperature being sensed by the temperature sensor.

5. An electronic thermometer according to claim 2, 3, or 4 wherein the display means is comprised of a digital display.

6. An electronic thermometer according to claim 1, wherein the display means is comprised of an analog display means and this analog display means displays a predicted converged temperature range which is flavored with both the sensed temperature of the temperature sensor and the range of error.

7. An electronic thermometer according to claim 6, wherein the sensed temperature and the predicted converged temperature range are displayed on the single analog display means in different display modes.

8. An electronic thermometer according to claim 1, wherein the range of error is preset according to each predicted converged temperature difference computed by the predicted temperature computing means.

9. An electronic thermometer according to claim 1, wherein the range of error is present according to the passage of time after the beginning of measuring.

* * * * *